(12) United States Patent
Sugamoto (10) Patent No.: US 10,594,238 B2
(45) Date of Patent: Mar. 17, 2020

(54) DRIVING CIRCUIT FOR STEPPING MOTOR

(71) Applicant: ROHM CO., LTD., Kyoto-Shi, Kyoto (JP)

(72) Inventor: Hiroki Sugamoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/997,061

(22) Filed: Jun. 4, 2018

(65) Prior Publication Data

US 2018/0351490 A1 Dec. 6, 2018

(30) Foreign Application Priority Data

Jun. 5, 2017 (JP) .................... 2017-110590
May 22, 2018 (JP) .................... 2018-098013

(51) Int. Cl.
*H02P 8/12* (2006.01)
*H02P 8/34* (2006.01)
*H02P 8/16* (2006.01)

(52) U.S. Cl.
CPC ............ *H02P 8/12* (2013.01); *H02P 8/16* (2013.01); *H02P 8/34* (2013.01)

(58) Field of Classification Search
CPC ...... H02P 7/04; H02P 8/00; H02P 8/12; H02P 8/16; H02P 8/34
USPC .................................. 318/685, 696
See application file for complete search history.

(56) References Cited

U.S. PATENT DOCUMENTS

| | | | | |
|---|---|---|---|---|
| 3,909,674 A * | 9/1975 | Spence | ............... | H03K 17/162 327/382 |
| 4,845,417 A * | 7/1989 | Ohkubo | ............... | G11B 5/5547 318/696 |
| 5,164,650 A * | 11/1992 | Kikugawa | ............... | H02P 8/14 318/696 |
| 5,625,268 A * | 4/1997 | Miyanari | ............... | H02P 8/20 318/280 |
| 5,656,910 A * | 8/1997 | Erckert | ............... | H02P 8/12 318/293 |
| 2005/0052217 A1* | 3/2005 | Furuie | ............... | H03K 17/168 327/434 |
| 2016/0065102 A1* | 3/2016 | Sicard | ............... | H03K 17/18 318/400.27 |

FOREIGN PATENT DOCUMENTS

JP          2008263733 A         10/2008

* cited by examiner

*Primary Examiner* — Bentsu Ro
(74) *Attorney, Agent, or Firm* — Cantor Colburn LLP (57) ABSTRACT

A direction setting pin DIR receives a direction signal ROT that indicates the rotational direction of the stepping motor. A clock pin CLK receives a clock signal CLK that indicates the rotational direction of the stepping motor. A logic circuit generates a first internal signal and a second internal signal that respectively indicate the states of the first H-bridge circuit and the second H-bridge circuit according to the direction signal ROT and the clock signal CLK. When the clock signal CLK remains in a predetermined state for a predetermined judgment time, the logic circuit transits to a predetermined mode.

11 Claims, 12 Drawing Sheets

FIG.5A (RESET POSITION)

DRIVING CIRCUIT FOR STEPPING MOTOR

CROSS-REFERENCE TO RELATED APPLICATIONS

The present application claims priority under 35 U.S.C. § 119 to Japanese patent Application No. 2017-110590 filed on Jun. 5, 2017 and Japanese patent Application No. 2018-098013 filed May 22, 2018 the entire contents of which are incorporated herein by reference.

BACKGROUND OF THE INVENTION

1. Field of the Invention

The present invention relates to a driving circuit for a stepping motor.

2. Description of the Related Art

In many cases, various kinds of electronic devices such as digital still cameras, digital video cameras, disk apparatuses, printers, copiers, and the like employ stepping motors for various kinds of operations such as adjustment of the position of movable components such as lenses, pickup heads, print heads, etc., driving operations for driving a sheet feeder roller, and the like. Such a stepping motor is configured as a synchronous motor that rotates in synchronization with a step pulse signal applied by an external circuit. The stepping motor has high controllability for starting, stopping, and positioning. The rotational angle (step angle) per pulse is determined by the characteristics of the motor and the excitation method thereof. Furthermore, the stepping motor can be driven using an open-loop control method. In addition, the stepping motor has an advantage of being suitable for digital signal processing.

Figure 1:
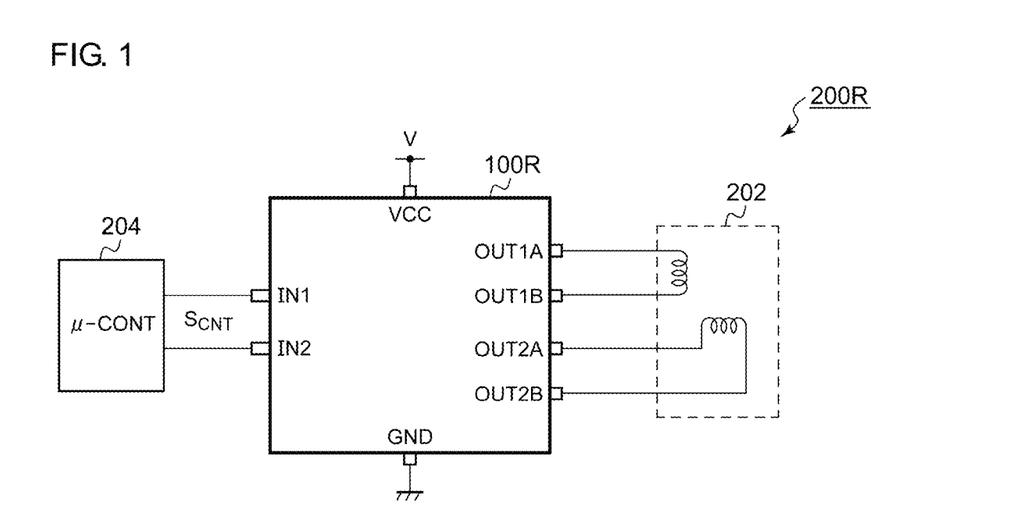
FIG. 1 is a block diagram showing a system including a driving circuit for a stepping motor.

FIG. 1 is a block diagram showing a system 200R including a driving circuit 100R for a stepping motor. A stepping motor 202 includes two coils L1 and L2. The coil L1 of the stepping motor 202 is coupled to output terminals (pins) OUT1A and OUT1B of the driving circuit 100R. The coil L2 is coupled to output terminals OUT2A and OUT2B. The driving circuit 100R receives a control instruction $S_{CNT}$ from an external controller 204, and drives the stepping motor 202 according to the control instruction $S_{CNT}$.

In a case of an application that prioritizes reduction in the size of an IC, there is a need to reduce the number of pins of a package. As shown in FIG. 1, the driving circuit 100R requires the following six pins.
  Power supply pin VCC
  Ground pin GND
  Four output pins OUT1A, OUT1B, OUT2A, OUT2B Accordingly, in a case in which the driving circuit 100R shown in FIG. 1 is configured to have eight pins, only two pins can be assigned as interface pins for the controller 204. In a case in which the remaining two pins are assigned to a clock signal (which is also referred to as the "control pulse") and a binary signal for indicating the rotation direction, additional functions cannot be implemented in the driving circuit 100R.

SUMMARY OF THE INVENTION

The present invention has been made in order to solve such a problem. Accordingly, it is an exemplary purpose of an embodiment of the present invention to provide a driving circuit having an additional function implemented without involving an increase in the number of pins.

An embodiment of the present invention relates to a driving circuit for a stepping motor comprising a first coil and a second coil. The driving circuit comprises: a first H-bridge circuit coupled to the first coil; a second H-bridge circuit coupled to the second coil; a direction setting pin structured to receive a direction signal that indicates a rotational direction of the stepping motor; a clock pin structured to receive a clock signal that indicates a rotational operation of the stepping motor; a logic circuit structured to generate a first internal signal and a second internal signal that indicate respective states of the first H-bridge circuit and the second H-bridge circuit according to the direction signal and the clock signal; a first pre-driver structured to drive the first H-bridge circuit according to the first internal signal; and a second pre-driver structured to drive the second H-bridge circuit according to the second internal signal. When the clock signal remains in a predetermined state for a predetermined judgment time, the logic circuit transits to a predetermined mode.

With this embodiment, this arrangement requires only two interface pins, without increasing the number of pins, to support an additional mode as a new function.

With an embodiment, a high-impedance mode may be employed as the predetermined mode, for example. In the high-impedance mode, the first internal signal and the second internal signal are generated such that an output of the first H-bridge circuit and an output of the second H-bridge circuit are each set to a high-impedance state. In the high-impedance mode, the supply of power to the stepping motor is suspended, thereby allowing current consumption to be reduced.

Also, in the high-impedance mode, the logic circuit may maintain the operations of all circuit blocks of the driving circuit. In a case in which several circuit blocks are shut down in the high-impedance mode, such an arrangement requires a predetermined period of time to restore the driving circuit, which involves the occurrence of a delay the next time the rotational operation is restarted. By maintaining the operations of the circuit blocks, this arrangement is capable of switching the stationary state to the rotating state without involving the occurrence of such a delay.

Also, in the high-impedance mode, the logic circuit may be structured to shut down at least one circuit block in the high-impedance state. This allows current consumption to be further reduced.

With an embodiment, a weak excitation mode is employed as the predetermined mode. In the weak excitation mode, the output current of the H-bridge circuit is reduced as compared with that in the normal excitation mode. With such an arrangement, a small amount of current is applied to the coil so as to maintain the position of the rotor, thereby allowing power consumption to be reduced.

Another embodiment of the present invention relates to a system. The system comprises: a processor; a stepping motor; and any one of the driving circuits structured to drive the stepping motor according to a direction signal and a clock signal received from the processor.

Yet another embodiment of the present invention also relates to a driving circuit for a stepping motor comprising a first coil and a second coil. The driving circuit comprises: a first H-bridge circuit coupled to the first coil; a second H-bridge circuit coupled to the second coil; a clock pin structured to receive a clock signal that indicates a rotational operation of the stepping motor; a control pin structured to receive a control signal for controlling states of the first H-bridge circuit and the second H-bridge circuit; a logic circuit structured to determine a rotational direction based on a state of the clock signal and a state of the control signal, and to generate a first internal signal and a second internal signal that respectively indicate the states of the first H-bridge circuit and the second H-bridge circuit according to the clock signal; a first pre-driver structured to drive the first H-bridge circuit according to the first internal signal; and a second pre-driver structured to drive the second H-bridge circuit according to the second internal signal.

With this embodiment, this arrangement requires only two interface pins for external circuits to switch the rotational direction of the motor without the supply of a dedicated control signal for indicating the rotational direction of the motor.

When the clock signal and the control signal each remain in a predetermined state for a predetermined judgment time, the rotational direction may be switched to a direction that is the reverse of the immediately previous rotational direction (toggled).

Also, when the control signal is set to a predetermined level, the logic circuit may shut down at least a part of the driving circuit. This allows current consumption to be further reduced.

Also, during a period of time in which the control signal is set to a predetermined level, the logic circuit may maintain the operations of all the circuit blocks of the driving circuit. In a case in which several circuit blocks are shut down in the high-impedance mode, such an arrangement requires a predetermined period of time to restore the driving circuit, which involves the occurrence of a delay the next time the rotational operation is restarted. By maintaining the operations of the circuit blocks, this arrangement is capable of switching the stationary state to the rotating state without involving the occurrence of such a delay.

Yet another embodiment of the present invention relates to a system. The system comprises: a processor; a stepping motor; and any one of the driving circuits structured to drive the stepping motor according to a control signal and a clock signal received from the processor.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

First Embodiment

Figure 2:
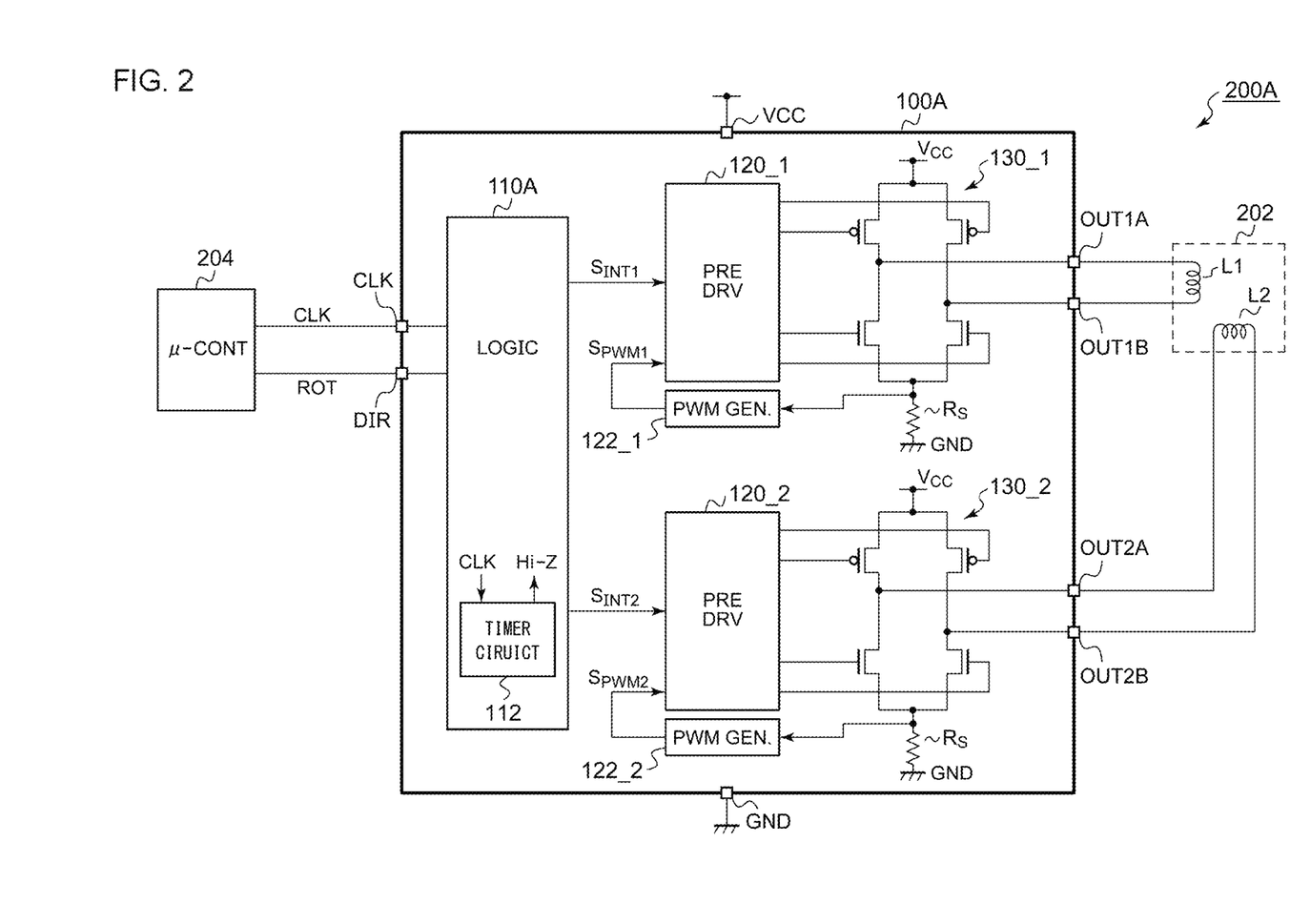
FIG. 2 is a block diagram showing a system including a driving circuit according to a first embodiment.

FIG. 2 is a block diagram showing a system 200A including a driving circuit 100A according to a first embodiment. A stepping motor 202 includes a first coil L1 and a second coil L2. A power supply voltage is supplied to a power supply (VCC) pin of the driving circuit 100A. A ground (GND) pin thereof is grounded.

The driving circuit 100A includes a logic circuit 110A, a first pre-driver 120_1, a second pre-driver 120_2, a first PWM generator 122_1, a second PWM generator 122_2, a first H-bridge circuit 130_1, and a second H-bridge circuit 130_2. The first H-bridge circuit 130_1 is arranged such that its output is coupled to the first coil L1. The second H-bridge circuit 130_2 is arranged such that its output is coupled to the second coil L2. The driving circuit 100A is provided with an OUT1A pin, an OUT1B pin, an OUT2A pin, and an OUT2B pin. The first H-bridge circuit 130_1 and the second H-bridge circuit 130_2 each include a sensing resistor $R_S$ for detecting a driving current. A voltage drop occurs across the sensing resistor $R_S$ in proportion to the driving current. The voltage drop is supplied to the corresponding PWM generator 122.

The driving circuit 100A drives the stepping motor 202 according to a control signal received from the controller 204. The controller 204 is configured as a microcontroller or a CPU. The driving circuit 100A is provided with a direction setting (DIR) pin and a clock (CLK) pin. The DIR pin receives, as an input signal, a direction indication (ROT) signal that indicates the rotation direction (clockwise direction or counterclockwise direction) to be set for the stepping motor 202. Furthermore, the CLK pin receives, as an input signal, a clock (CLK) signal that indicates the rotational operation of the stepping motor 202.

The logic circuit 110A generates a first internal signal $S_{INT1}$ and a second internal signal $S_{INT2}$ that respectively indicate the states of the first H-bridge circuit 130_1 and the second H-bridge circuit 130_2 according to the ROT signal and the CLK signal. The logic circuit 110A may generate the internal signals using known techniques. Examples of the method for generating the internal signals include: a 1-2 phase excitation method in which the current phase is rotated by 45 degrees for every edge of the CLK signal; and a 2-2 phase excitation method in which the current phase is rotated by 90 degrees for every edge of the CLK signal. The logic circuit 110A may perform a micro-step driving operation in which the internal signal is modulated with a frequency that is N (N is an integer) times the frequency of the CLK signal.

The first PWM generator 122_1 generates a first PWM signal $S_{PWM1}$ based on the voltage drop across the sensing resistor $R_S$ of the corresponding first H-bridge circuit 130_1 such that the driving current is stabilized to a setting value. Similarly, the second PWM generator 122_2 generates a second PWM signal $S_{PWM2}$ based on the voltage drop across the sensing resistor $R_S$ of the corresponding second H-bridge circuit 130_2 such that the driving current is stabilized to a setting value. In order to suppress audible-band noise, the frequency of each of the PWM signals $S_{PWM1}$ and $S_{PWM2}$ (PWM frequency) is designed to be equal to or higher than 20 kHz that is outside the audible noise band. Accordingly, the maximum period of the PWM signal is 50 μs.

The first pre-driver 120_1 drives the first H-bridge circuit 130_1 based on the first internal signal $S_{INT1}$ and the first PWM signal $S_{PWM1}$. Similarly, the second pre-driver 120_2 drives the second H-bridge circuit 130_2 based on the second internal signal $S_{INT2}$ and the second PWM signal $S_{PWM2}$.

When the CLK signal remains in a predetermined state (e.g., low level) for a predetermined time τ, the logic circuit 110A is set to the high-impedance mode. In the high-impedance mode, the logic circuit 110A generates the first internal signal $S_{INT1}$ and the second internal signal $S_{INT2}$ such that the outputs of the first H-bridge circuit 130_1 and the second H-bridge circuit 130_2 are set to the high-impedance state, i.e., such that all the transistors that form each H-bridge circuit are turned off at the same time.

The number of pulses of the PWM signal to be output for a given excitation position (required PWM pulse number) M is determined according to the rotational load and the rotational speed of the stepping motor. The maximum period of the PWM signal is 50 μs. Accordingly, when the stepping motor is to be rotated at a constant rotational speed, the CLK signal is input with a period of 50 μs×M (or otherwise 50 μs×M or more). Accordingly, the judgment time τ is preferably designed to be longer than 50 μs×K (K≥M).

The logic circuit 110A may include a timer circuit 112A that monitors the state of the CLK signal. The configuration of the timer circuit 112A is not restricted in particular. For example, the timer circuit 112A may be configured such that, during a period in which the CLK signal remains at the low level, the timer circuit 112A counts up (or otherwise counts down) in synchronization with a high-speed internal clock CLKINT of the driving circuit 100A, and such that the timer circuit 112A is reset every time the CLK signal becomes the high level. When the count value of the timer circuit 112A reaches a value that corresponds to the judgment time τ, the timer circuit 112A asserts (sets to the high level, for example) a high-impedance setting (Hi-Z) signal. The logic circuit 110A sets the internal signals $S_{INT1}$ and $S_{INT2}$ using an assertion of the Hi-Z signal as a trigger such that the outputs of the first H-bridge circuit 130_1 and the second H-bridge circuit 130_2 each become the high-impedance state.

With the embodiment, in the high-impedance mode, the logic circuit 110A maintains the operation states of all the circuit blocks of the driving circuit. The above is the configuration of the driving circuit 100A. Next, description will be made regarding the operation thereof.

Figure 3A:
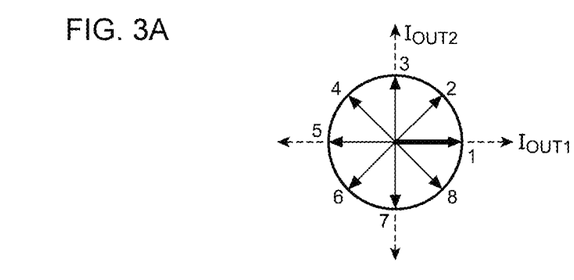
FIG. 3A is a diagram showing the relation between the excitation position and the currents $I_{OUT1}$ and $I_{OUT2}$ in the 1-2 phase excitation method.

FIG. 3A is a diagram showing the relation between the excitation position and the currents $I_{OUT1}$ and $I_{OUT2}$ in the 1-2 phase excitation method. For example, when the ROT signal is set to the low-level state, the driving circuit 100A changes the excitation position by +1, i.e., in the counterclockwise (CCW) direction, every time an edge occurs in the CLK signal. Conversely, when the ROT signal is set to the high-level state, the driving circuit 100A changes the excitation position by −1, i.e., in the clockwise (CW) direction, every time an edge occurs in the CLK signal. The driving circuit 100A may change the excitation position with a finer resolution by means of the micro-step driving operation.

Figure 3B:
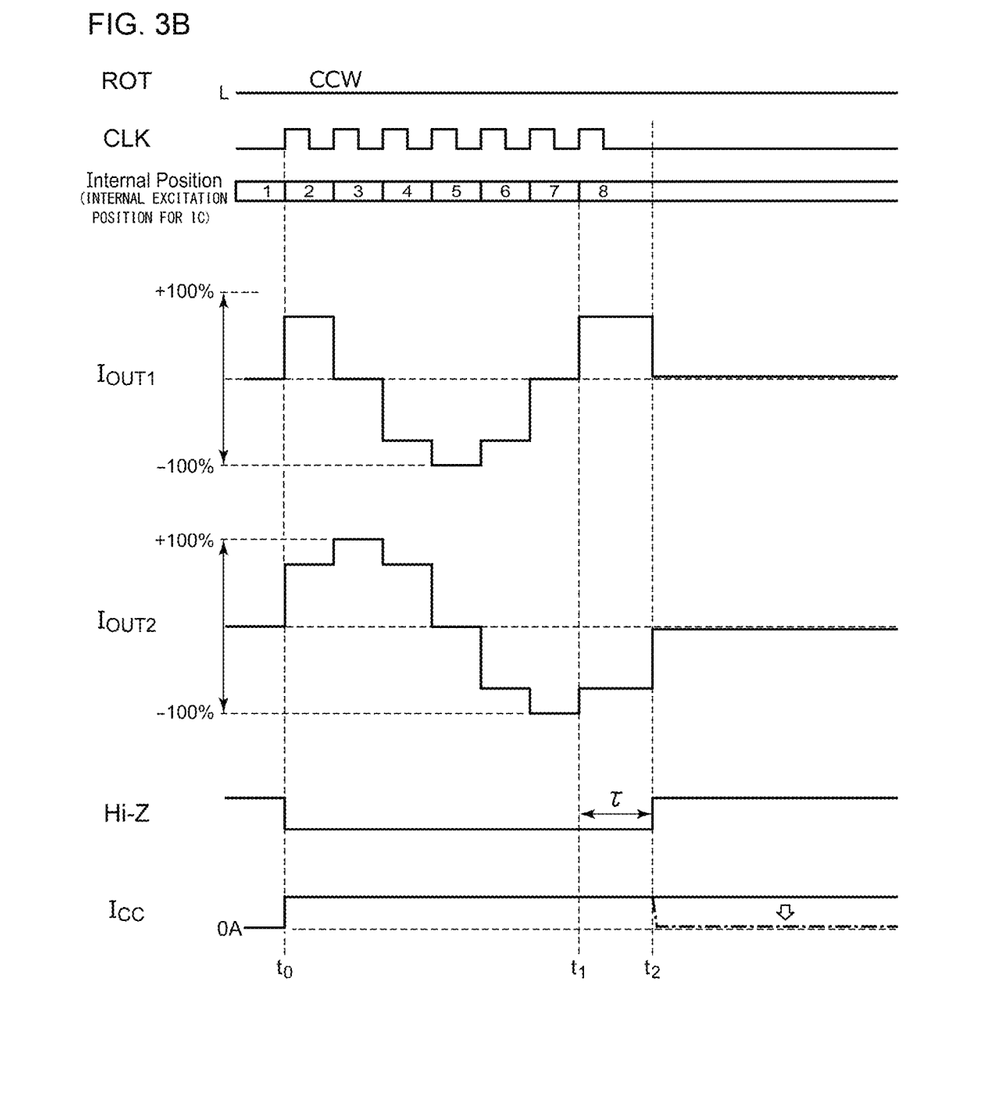
FIG. 3B is an operation waveform diagram showing an operation of the driving circuit shown in FIG. 2.

FIG. 3B is an operation waveform diagram showing the operation of the driving circuit 100A shown in FIG. 2. In this example, the ROT signal is set to the low level, which is an indication for the rotation in the counterclockwise (CCW) direction. Before the time point $t_0$, the driving circuit 100A is set to the high-impedance mode Hi-Z. In this state, the stepping motor 202 suspends its operation at the excitation position 1.

After the time point $t_0$, the cyclic CLK signal is input. This sets the Hi-Z signal to the low level, which switches the driving circuit 100A from the high-impedance mode to the normal operation mode. In the normal operation mode, the driving circuit 100A changes the currents $I_{OUT1}$ and $I_{OUT2}$ in synchronization with an edge of the CLK signal. This instructs the stepping motor 202 to rotate by an angle according to the number of pulses.

When the judgment time τ has elapsed after the last CLK signal is generated at the time point $t_1$, the Hi-Z signal is asserted at the time point $t_2$, which sets the driving circuit 100A to the high-impedance mode. In the high-impedance mode, the currents $I_{OUT1}$ and $I_{OUT2}$ are set to zero, which fixes the rotational position of the stepping motor 202.

The above is the operation of the driving circuit 100A. With the driving circuit 100A, this arrangement requires only the two external interface pins to provide the high-impedance mode to be implemented as an additional function. In the high-impedance mode, current supply to the stepping motor 202 is suspended, thereby allowing the current consumption to be reduced.

Second Embodiment

A driving circuit 100B according to a second embodiment has the same basic configuration as that of the driving circuit 100A shown in FIG. 2. The point of difference from the driving circuit 100A is that the driving circuit 100B is set to the standby state in the high-impedance mode. In the standby state, at least a part of the circuit block (e.g., protection circuit or bias circuit) of the driving circuit 100B is shut down. In this state, the consumed current (power supply current) $I_{CC}$ of the driving circuit 100B is reduced to substantially zero. The power supply current $I_{CC}$ of the driving circuit 100B is represented by the line of alternately long and short dashes shown in FIG. 3B.

With the driving circuit 100B, this arrangement allows the operation current of the driving circuit 100B itself to be reduced in the high-impedance mode. Accordingly, this allows the operation current of the overall system to be reduced.

It should be noted that, in a case in which several circuit blocks are shut down in the high-impedance mode, a predetermined period of time is required to restore the circuit blocks thus shut down. Accordingly, this arrangement involves a delay the next time the rotational operation is restarted.

With the driving circuit 100A shown in FIG. 2, the circuit blocks are not shut down, i.e., the operations of all the circuit blocks are maintained. Accordingly, the driving circuit 100A has an advantage of being capable of switching from the stationary state to the rotational operation state without involving a delay.

That is to say, whether or not such several circuit blocks are to be shut down in the high-impedance mode may be determined giving consideration to whether responsivity or power consumption is to be prioritized.

Third Embodiment

Figure 4:
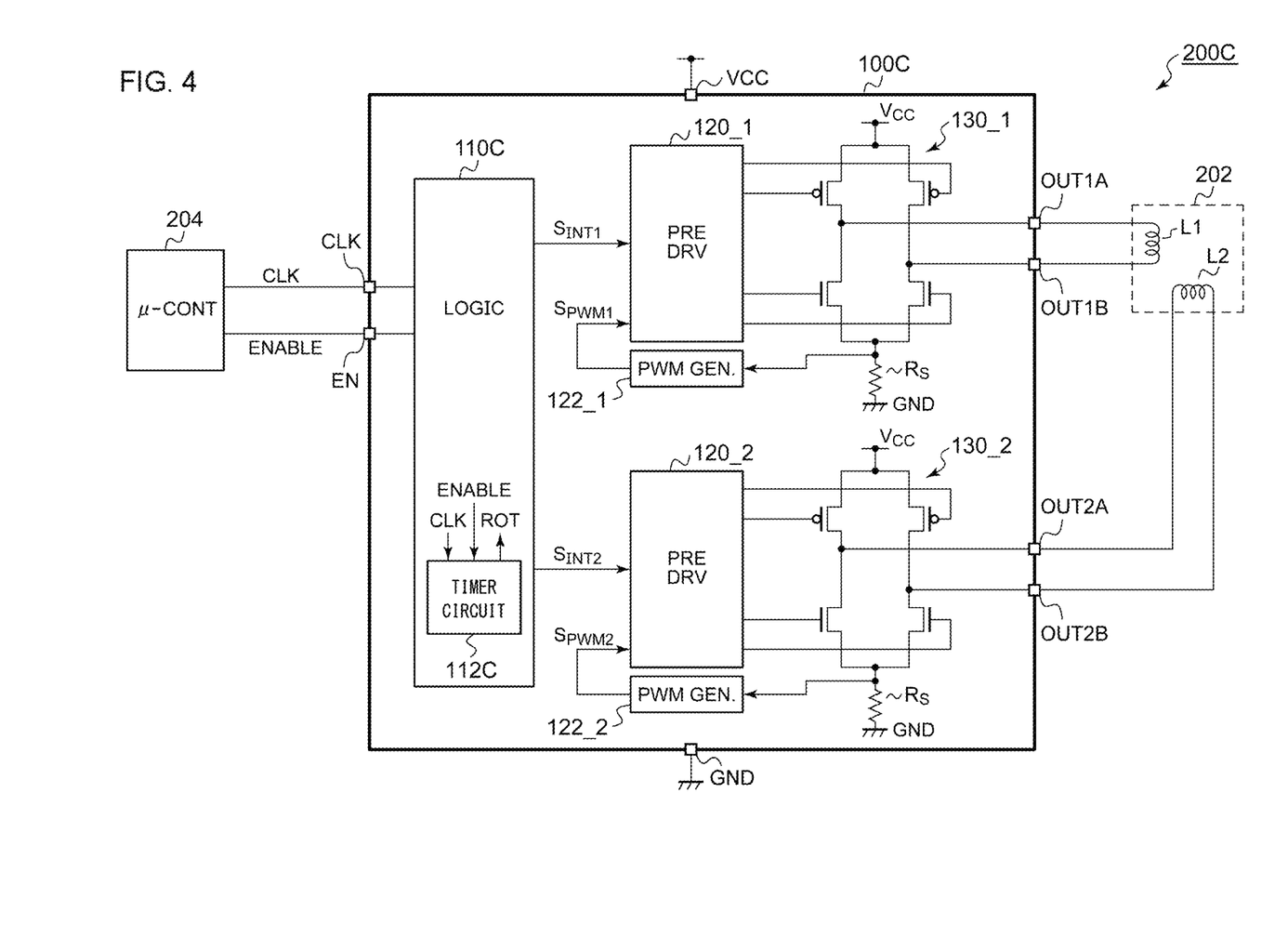
FIG. 4 is a block diagram showing a system including a driving circuit according to a third embodiment.

FIG. 4 is a block diagram showing a system 200C including a driving circuit 100C according to a third embodiment.

The driving circuit 100C is provided with an enable (EN) pin instead of the DIR pin shown in FIG. 2. An enable (ENABLE) signal is input from the controller 204 to the EN pin. When the first H-bridge circuit 130_1 and the second H-bridge circuit 130_2 are to be set to the normal operation mode, the ENABLE signal is asserted (set to the high level, for example). When the first H-bridge circuit 130_1 and the second H-bridge circuit 130_2 are to be set to the high-impedance mode, the ENABLE signal is negated (set to the low level, for example).

With an embodiment, the logic circuit 110C may maintain the operation states of all the circuit blocks of the driving circuit in the high-impedance mode. Alternatively, at least a part of the circuit blocks may be shut down in the high-impedance mode.

The logic circuit 110C determines the rotational direction based on the states of the CLK signal and the ENABLE signal, and generates a direction indication (ROT) signal that indicates the rotational direction. For example, when the rotational direction is to be set to the counterclockwise (CCW) direction, the ROT signal may be set to the low level. Conversely, when the rotational direction is to be set to the clockwise (CW) direction, the ROT signal may be set to the high level.

The logic circuit 110C generates the first internal signal $S_{INT1}$ and the second internal signal $S_{INT2}$ that respectively indicate the states of the first H-bridge circuit 130_1 and the second H-bridge circuit 130_2 according to the CLK signal and the ROT signal.

When the CLK signal and the ENABLE signal remain in predetermined states for a predetermined judgment time τ, the logic circuit 110C logically inverts (toggles) the ROT signal so as to switch the rotational direction to the reverse direction. More specifically, when the ENABLE signal indicates the normal operation mode (high) and the CLK signal remains in the suspended state (i.e., non-input state) over the judgement time τ or more, the ROT signal is logically inverted. The judgement time τ may be designed in the same way as in the first embodiment.

The logic circuit 110C may include a timer circuit 112C that monitors the states of the CLK signal and the ENABLE signal. The configuration of the timer circuit 112C is not restricted in particular. For example, the timer circuit 112C may be configured to count up (or otherwise count down) in synchronization with the high-speed internal clock CLKINT of the driving circuit 100C during a period in which the CLK signal remains in the low-level state and the ENABLE signal remains in the high-level state, and to be reset every time there is a state transition in the CLK signal or the ENABLE signal. When the count value of the timer circuit 112C reaches a value that corresponds to the judgment time τ, the ROT signal may be logically inverted.

With a modification, the state in which the ENABLE signal indicates the high-impedance mode and the supply of the CLK signal is suspended exceeds the judgment time τ, the ROT signal may be logically inverted. With another modification, the state in which the ENABLE signal is fixed to the high level or otherwise the low level and the supply of the CLK signal exceeds the judgment time τ, the ROT signal may be logically inverted.

Figure 5A:
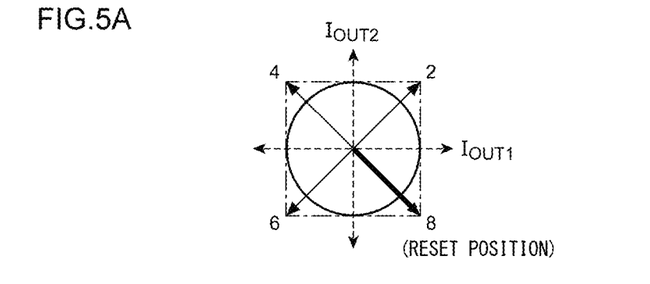
FIG. 5A is a diagram showing the relation between the excitation position and the currents $I_{OUT1}$ and $I_{OUT2}$ in the 2-2 phase excitation method.

Next, description will be made regarding the operation of the driving circuit 100C. Here, description will be made regarding an example employing a 2-2 phase excitation method. FIG. 5A is a diagram showing the relation between the excitation position and the currents $I_{OUT1}$ and $I_{OUT2}$ in the 2-2 phase excitation method. For example, in a state in which the ROT signal is set to the low level, the driving circuit 100C changes the excitation position by +2, i.e., by 2 in the counterclockwise (CCW) direction, every time an edge occurs in the CLK signal. Conversely, in a state in which the ROT signal is set to the high level, the driving circuit 100C changes the excitation position by −2, i.e., by 2 in the clockwise (CW) direction, every time an edge occurs in the CLK signal. The driving circuit 100C may change the excitation position with a finer resolution by means of a micro-step driving operation.

Figure 5B:
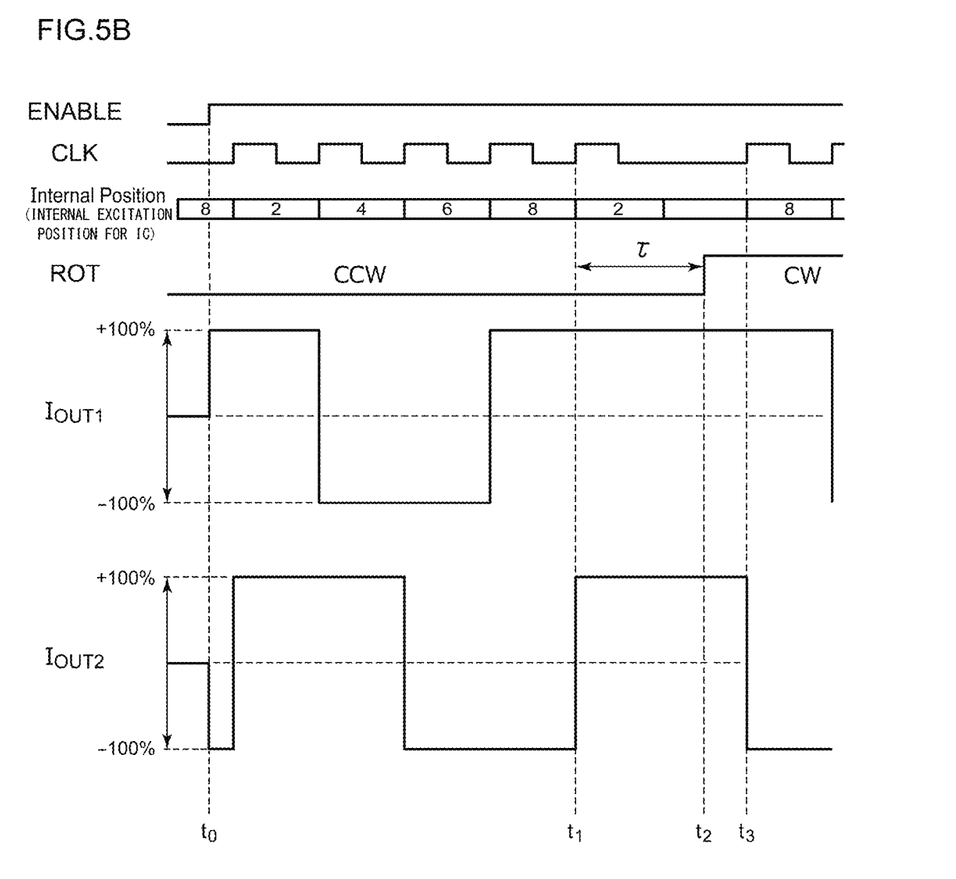
FIG. 5B is an operation waveform diagram showing an operation of the driving circuit shown in FIG. 4.

FIG. 5B is an operation waveform diagram showing the operation of the driving circuit 100C shown in FIG. 4. Before the time point $t_0$, the ENABLE signal is set to the low level. Accordingly, the driving circuit 100C is set to the high-impedance mode Hi-Z. In this state, the operation of the stepping motor 202 is suspended at the excitation position 8 (reset position). The ROT signal is set to the low level, which indicates a state in which the rotational direction is set to the counterclockwise (CCW) direction.

When the ENABLE signal transits to the high level at the time point $t_0$, the driving circuit 100C transits to the normal operation mode. In this state, when a cyclic CLK signal is input, the excitation position is changed in increments of 2.

At the time point $t_1$, the last CLK signal is generated. In this stage, the ENABLE signal is set to the high level. Accordingly, the timer circuit 112C advances the counting operation. At the time point $t_2$ after the judgment time τ has elapsed, the logical value of the ROT signal is inverted, which switches the rotational direction to the clockwise direction. Subsequently, when the next CLK signal is input at the time point $t_3$, the excitation position changes in the direction that is the reverse of the rotational direction set before the time point $t_1$.

Figure 6:
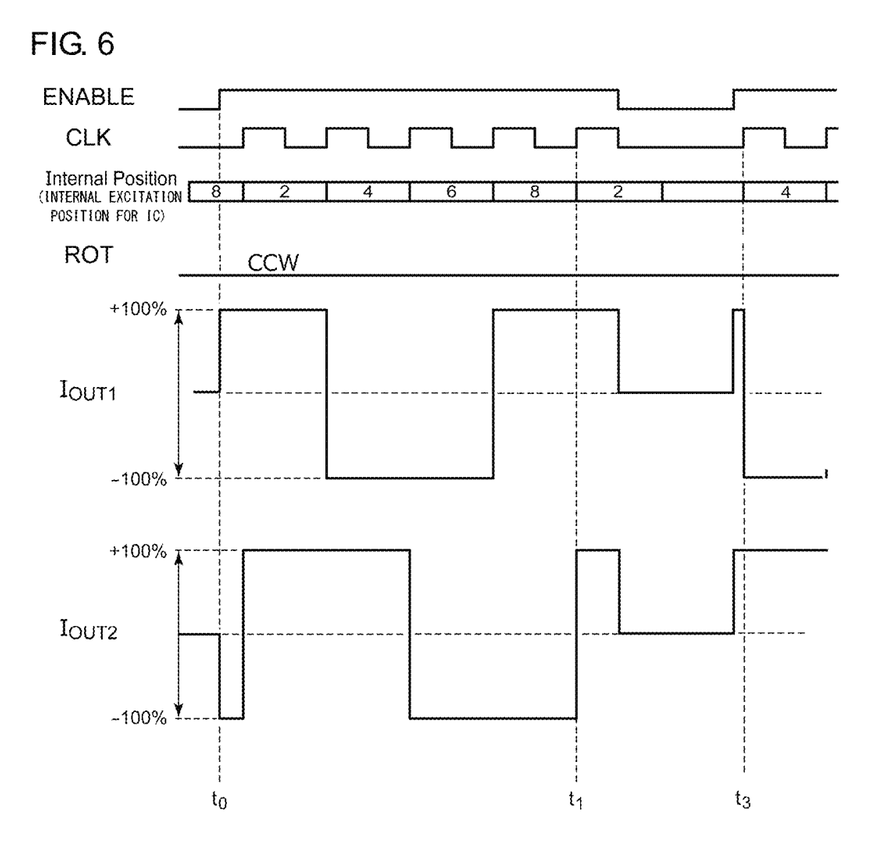
FIG. 6 is another operation waveform diagram showing the operation of the driving circuit shown in FIG. 4.

FIG. 6 is another operation waveform diagram showing the operation of the driving circuit 100C shown in FIG. 4. The operation before the time point $t_1$ is the same as that shown in FIG. 5B. At the time point $t_1$, the last CLK signal is generated, following which the rotational operation is suspended. Immediately after the generation of the last CLK signal, the ENABLE signal is set to the low level. In this case, the timer circuit 112C does not perform the counting operation, or otherwise is reset. Accordingly, in this case, the ROT signal is not logically inverted, which maintains the rotational direction in the counterclockwise direction. Subsequently, after the input of the CLK signal is restarted at the time point $t_3$, the excitation position is changed in the same direction as that set before the time point $t_1$.

The above is the operation of the driving circuit 100C.

With the driving circuit 100C, this arrangement requires only the two external interface pins to provide the high-impedance mode to be implemented as an additional function. In the high-impedance mode, current supply to the stepping motor is suspended, thereby allowing the current consumption to be reduced.

Fourth Embodiment

Figure 7:
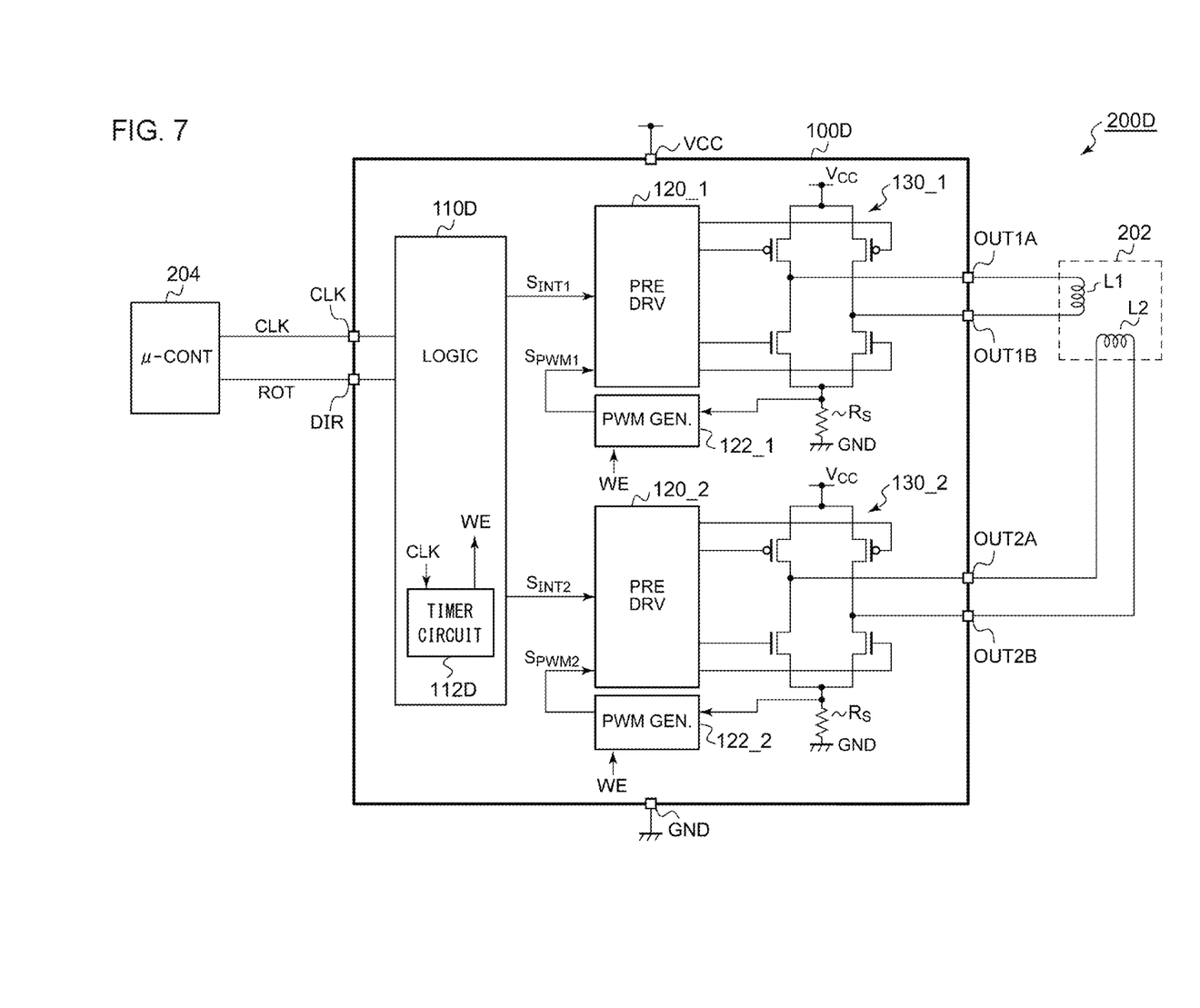
FIG. 7 is a block diagram showing a system including a driving circuit according to a fourth embodiment.

FIG. 7 is a block diagram showing a system 200D including a driving circuit 100D according to a fourth embodiment. The driving circuit 100D supports the normal excitation mode and the weak excitation mode.

The driving circuit 100D has the same input/output pins and the same basic configuration as those of the driving circuit 100A shown in FIG. 2.

When the CLK signal remains in a predetermined state (e.g., low-level state) for a predetermined judgment time τ, the logic circuit 110D is set to the weak excitation mode. In the weak excitation mode, the output currents of the first H-bridge circuit 130_1 and the second H-bridge circuit 130_2 are set to the respective output currents set in the normal excitation mode.

The logic circuit 110D may include a timer circuit 112D that monitors the state of the CLK signal. When the input of the CLK signal is continuously suspended over the judgment time τ, the timer circuit 112D asserts (sets to the high state, for example) a weak excitation (WE) signal.

The WE signal is input to the first PWM generator 122_1 and the second PWM generator 122_2. In a state in which the WE signal is asserted, the first PWM generator 122_1 and the second PWM generator 122_2 lower a threshold value that defines the peak value of the driving current to a value that is lower than that set in a state in which the WE signal is negated (normal excitation mode).

Figure 8:
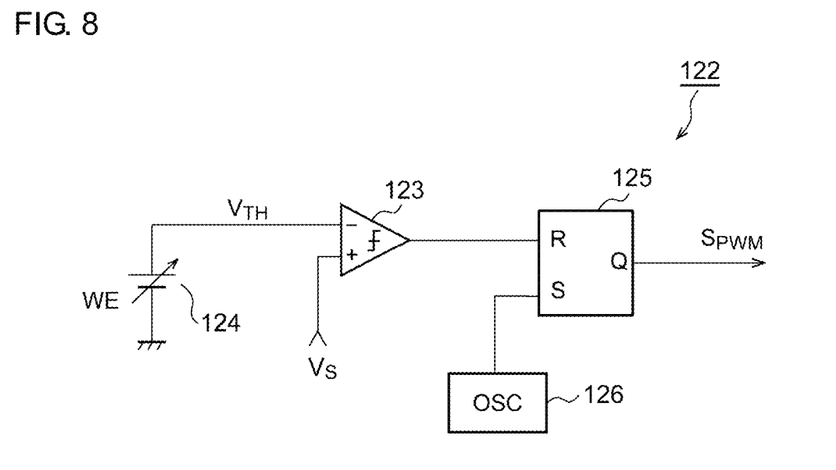
FIG. 8 is a circuit diagram showing an example configuration of a PWM generator.

FIG. 8 is a circuit diagram showing an example configuration of the PWM generator 122. The PWM generator 122 may include a comparator 123, a variable voltage source 124, a flip-flop 125, and an oscillator 126. The variable voltage source 124 generates the threshold voltage $V_{TH}$ having a first voltage level $V_{TH1}$ when the WE signal is set to the low level, and having a second voltage level $V_{TH2}$ that is lower than the first voltage level $V_{TH1}$ when the WE signal is set to the high level, i.e., is set to the weak excitation mode. The second voltage level $V_{TH2}$ may be designed to be 25% of the first voltage level $V_{TH1}$. The variable voltage source 124 may include a D/A converter. By bit shifting the input code of the D/A converter, this arrangement is capable of changing the voltage level of the threshold voltage $V_{TH}$ to be ½, ¼, . . . . Alternatively, the variable voltage source 124 may include a constant voltage source and a dividing circuit having a variable voltage dividing ratio.

The comparator 123 compares the voltage drop $V_S$ that occurs across the sensing resistor $R_S$ with the threshold voltage $V_{TH}$. When $V_S > V_{TH}$, the comparator 123 asserts an OFF signal (reset signal). The oscillator 126 generates an ON signal (set signal) that is asserted for every predetermined PWM period. The flip-flop 125 generates the PWM signal $S_{PWM}$ having a level that is switched between the high level and the low level according to the ON signal and the OFF signal.

Figure 9A:
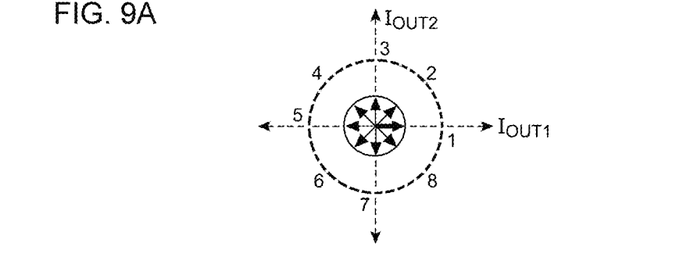
FIG. 9A is a diagram showing the relation between the excitation position and the currents $I_{OUT1}$ and $I_{OUT2}$ in the weak excitation mode in the 1-2 phase excitation method.
Figure 9B:
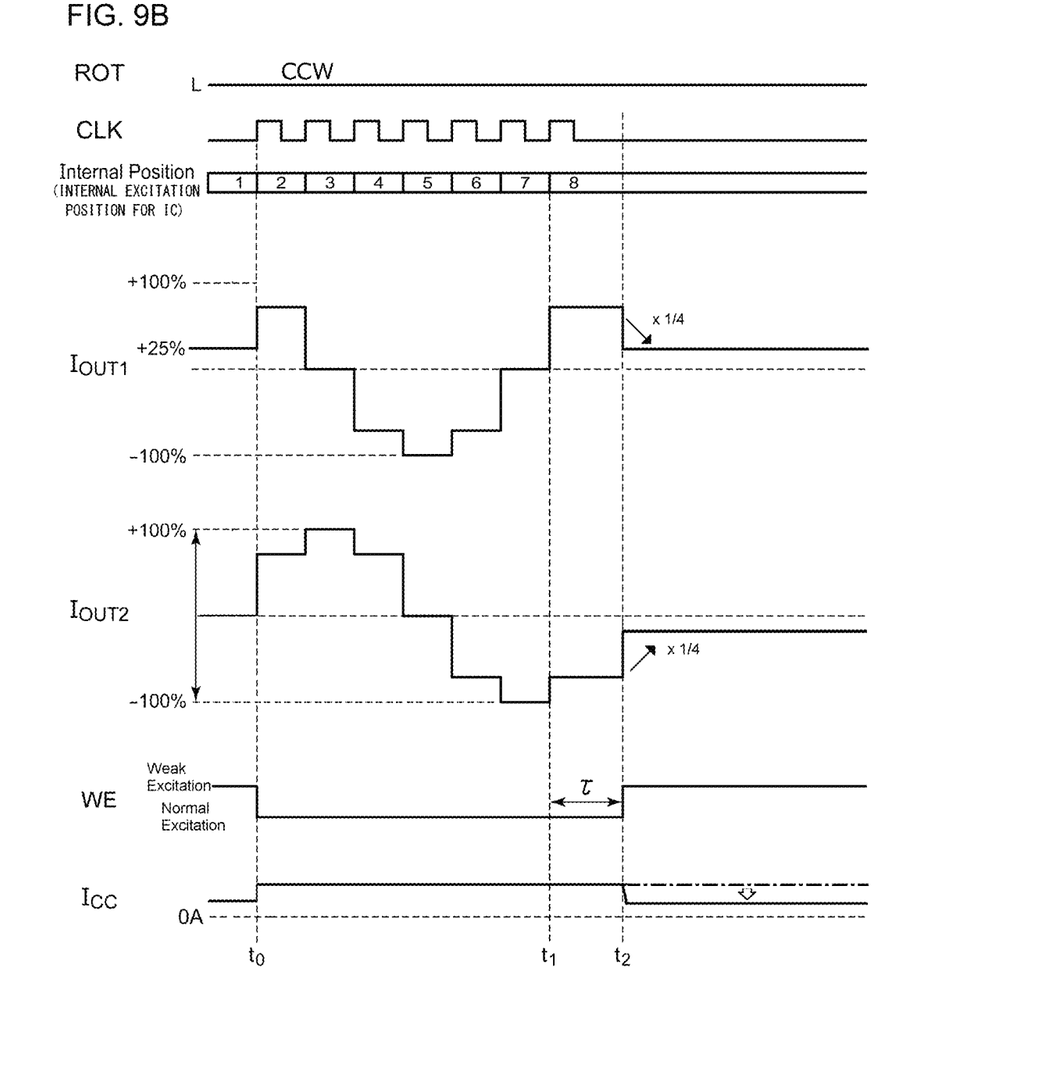
FIG. 9B is an operation waveform diagram showing the operation of the driving circuit shown in FIG. 7.

FIG. 9A is a diagram showing the relation between the excitation position and the currents $I_{OUT1}$ and $T_{OUT2}$ in the weak excitation mode in the 1-2 phase excitation method. FIG. 9B is an operation waveform diagram showing the operation of the driving circuit 100D shown in FIG. 7. FIG. 9A shows the currents $I_{OUT1}$ and $I_{OUT2}$ in the normal excitation mode, which are represented by broken lines.

FIG. 9B is an operation waveform diagram showing the operation of the driving circuit 100D shown in FIG. 7. In this example, the ROT signal is set to the low level, which indicates the rotational operation in the counterclockwise (CCW) direction. Before the time point $t_0$, the driving circuit 100A is set to the weak excitation mode. In this mode, the stepping motor 202 is set to the stationary state at the excitation position 1.

When the cyclic CLK signal is input after the time point $t_0$, the WE signal is set to the low level, which switches the driving circuit 100D from the weak excitation mode to the normal excitation mode. In the normal excitation mode, the driving circuit 100A changes the currents $I_{OUT1}$ and $I_{OUT2}$ in synchronization with an edge of the CLK signal. This rotates the stepping motor 202 by an angle corresponding to the number of pulses.

When the judgment time τ has elapsed after the last CLK signal is generated at the time point $t_1$, the WE signal is asserted at the time point $t_2$, which switches the excitation mode to the weak excitation mode. In the weak excitation mode, $I_{OUT1}$ and $I_{OUT2}$ are each set to 25% of the corresponding value in the normal excitation mode. In the weak excitation mode, the rotational position of the stepping motor 202 is fixed.

The above is the operation of the driving circuit 100D. With the driving circuit 100D, this arrangement requires only the two external interface pins to provide the weak excitation mode to be implemented as an additional function. In the weak excitation mode, this arrangement is capable of reducing current consumption while fixing the rotational position of the rotor using weak magnetic force.

Fifth Embodiment

Figure 10:
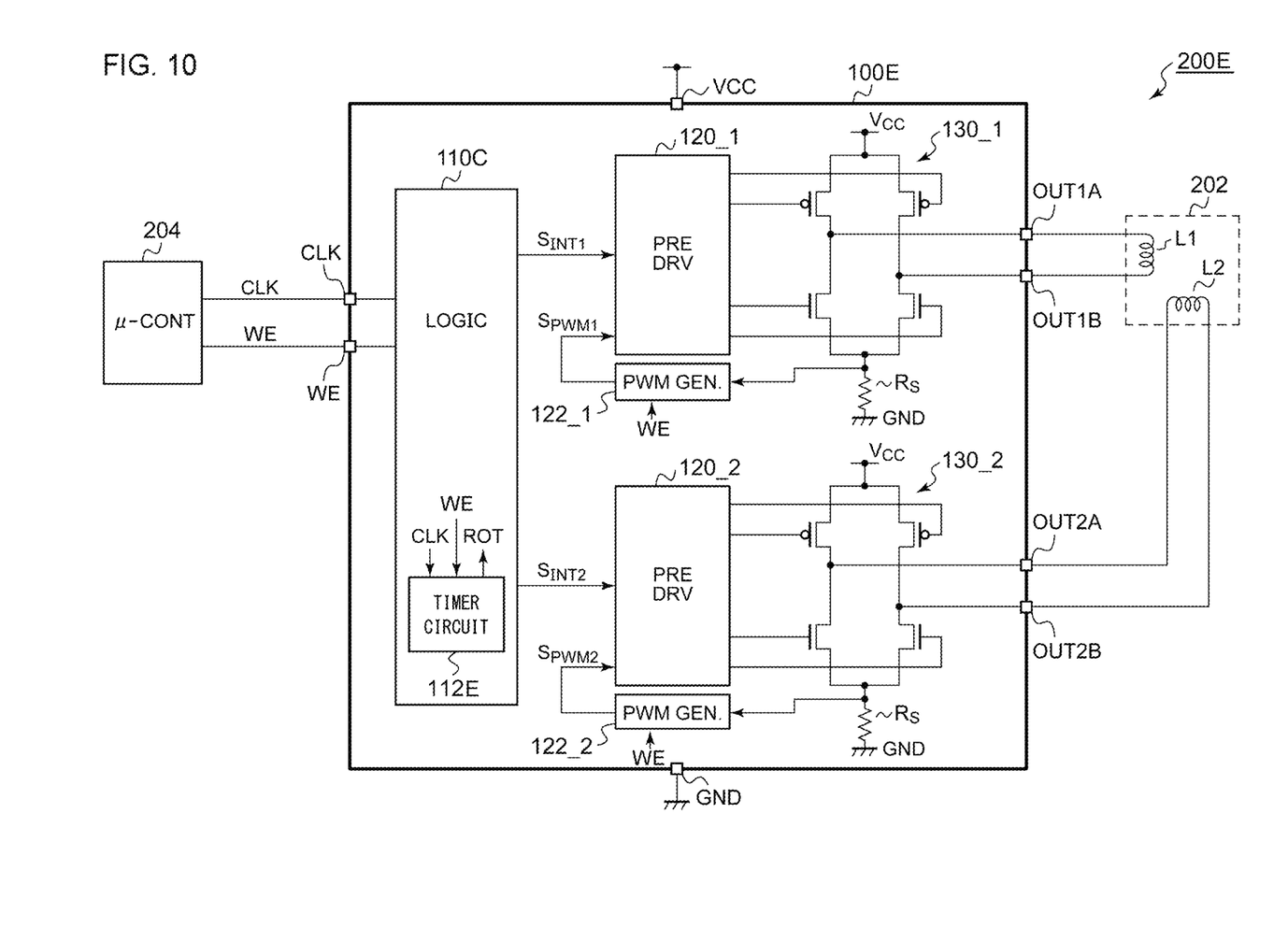
FIG. 10 is a block diagram showing a system including a driving circuit according to a fifth embodiment.

FIG. 10 is a block diagram showing a system 200E including a driving circuit 100E according to a fifth embodiment. The driving circuit 100E is provided with a weak excitation setting (WE) pin instead of the ENABLE pin shown in FIG. 4. The WE pin receives a control signal (WE signal) from the controller 204 for selecting the excitation mode from among the weak excitation mode and the normal excitation mode. When the first H-bridge circuit 130_1 and the second H-bridge circuit 130_2 are to be set to the normal operation mode, the WE signal is negated (set to the low level, for example). When the first H-bridge circuit 130_1 and the second H-bridge circuit 130_2 are to be set to the weak excitation mode, the WE signal is asserted (set to the high level, for example).

The logic circuit 110E determines the rotational direction based on the states of the CLK signal and the WE signal, and generates a direction indication (ROT) signal that indicates the rotational direction. For example, when the rotational direction is to be set to the counterclockwise (CCW) direction, the ROT signal may be set to the low level. Conversely, when the rotational direction is to be set to the clockwise (CW) direction, the ROT signal may be set to the high level.

The logic circuit 110E generates a first internal signal $S_{INT1}$ and a second internal signal $S_{INT2}$ that respectively indicate the states of the first H-bridge circuit 130_1 and the second H-bridge circuit 130_2 according to the CLK signal and the ROT signal.

When the CLK signal and the WE signal each remain in a predetermined state for the predetermined judgment time τ, the logic circuit 110E logically inverts (toggles) the ROT signal so as to switch the rotational direction to a direction that is the reverse of the immediately previous rotational direction.

More specifically, when the state in which the WE signal indicates the normal excitation mode (i.e., low level) and the supply of the CLK signal is suspended continues over the judgment time τ, the ROT signal is logically inverted.

The logic circuit 110E may include a timer circuit 112E that monitors the states of the CLK signal and the WE signal. The configuration of the timer circuit 112E is not restricted in particular. Also, the timer circuit 112E may be configured in the same manner as that of the timer shown in FIG. 4.

A modification may be made in which, when the state in which the WE signal indicates the weak excitation mode (i.e., high level) and the supply of the CLK signal is suspended continues over the judgment time τ, the ROT signal may be logically inverted. Also, another modification may be made in which, when the state in which the WE signal is fixed to the high level or otherwise the low level and the supply of the CLK signal is suspended continues over the judgment time τ, the ROT signal may be logically inverted.

Figure 11:
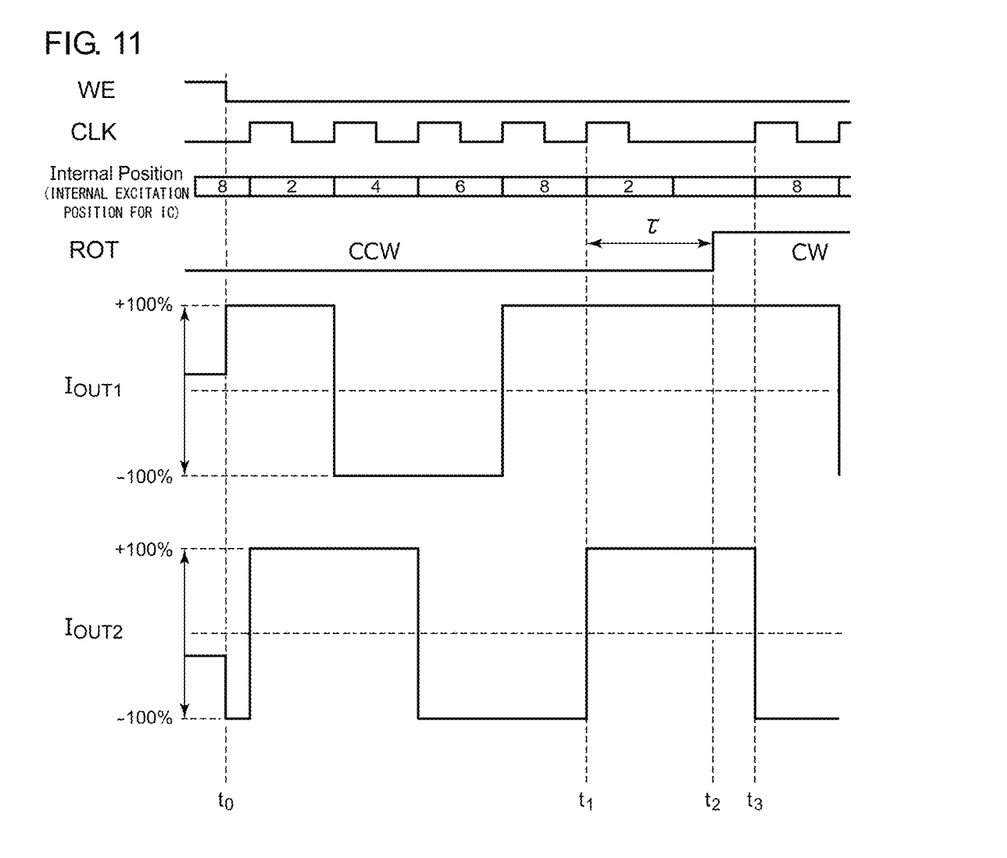
FIG. 11 is an operation waveform diagram showing the operation of the driving circuit shown in FIG. 10.

Next, description will be made regarding the operation of the driving circuit 100E. Here, description will be made regarding an example employing the 2-2 phase excitation method. FIG. 11 is an operation waveform diagram showing the operation of the driving circuit 100E shown in FIG. 10. Before the time point $t_0$, the WE signal is set to the high level, and accordingly, the driving circuit 100E is set to the weak excitation mode. The ROT signal is set to the low level, which sets the rotational direction to the counterclockwise (CCW) state.

When the WE signal is set to the low level at the time point $t_0$, the driving circuit 100E transits to the normal excitation mode. In this state, when the cyclic CLK signal is input, the excitation position is changed in increments of +2.

At the time point $t_1$, the last CLK signal is generated. In this stage, the WE signal is set to the low level. Accordingly, the timer circuit 112E advances the counting operation. When the judgment time τ has elapsed at the time point $t_2$, the logical value of the ROT signal is inverted, which switches the rotational direction to the clockwise direction. Subsequently, when the next CLK signal is input at the time point $t_3$, the excitation position is changed in a direction that is the reverse of that set at the time point $t_1$.

Figure 12:
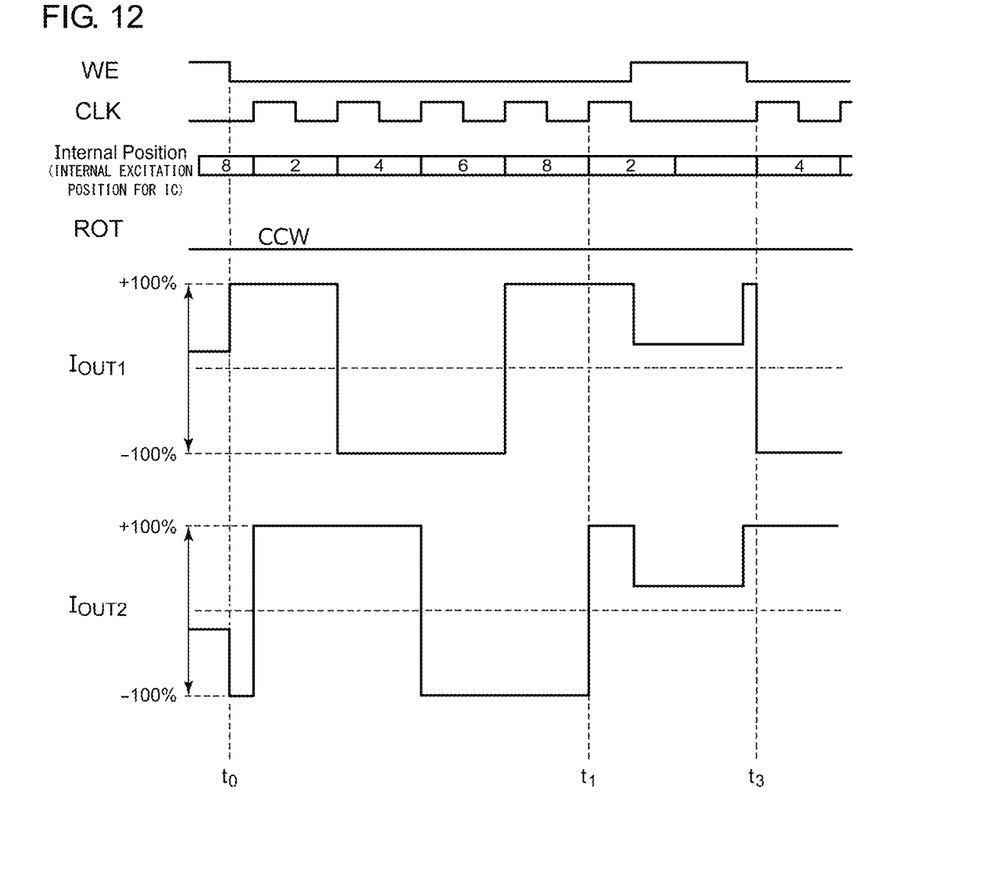
FIG. 12 is another operation waveform diagram showing the operation of the driving circuit shown in FIG. 10.

FIG. 12 is another operation waveform diagram showing the operation of the driving circuit 100E shown in FIG. 10. The operation before the time point $t_1$ is the same as that shown in FIG. 11. When the last CLK signal has been generated at the time point $t_1$, i.e., when the supply of the CLK signal is suspended, the rotational operation is suspended. Immediately after the supply of the CLK signal is suspended, the WE signal is set to the high level. In this case, the timer circuit 112E does not perform the counting operation (or does not advance the counting operation). Accordingly, in this case, the ROT signal is not logically inverted, which maintains the rotational direction in the counterclockwise direction. Subsequently, after the input of the CLK signal is restarted at the time point $t_3$, the excitation position is changed in the same direction as that set before the time point $t_1$. The above is the operation of the driving circuit 100E.

Description has been made in the embodiment regarding the driving circuit 100 that supports the PWM driving operation. However, the present invention is not restricted to such an arrangement. In a case in which the driving circuit does not support the stepping control operation for the phase currents, this arrangement does not require the PWM driving operation. In this case, the first PWM generator 122_1 and the second PWM generator 122_2 can be omitted.

While the preferred embodiments of the present invention have been described using specific terms, such description is for illustrative purposes only, and it is to be understood that changes and variations may be made without departing from the spirit or scope of the appended claims.

What is claimed is:

1. A driving circuit for a stepping motor comprising a first coil and a second coil, the driving circuit comprising:
    a first H-bridge circuit to be coupled to the first coil;
    a second H-bridge circuit to be coupled to the second coil;
    a direction setting pin to be coupled to receive a direction signal that specifies a rotational direction of the stepping motor;
    a clock pin to be coupled to receive a clock signal that indicates a rotational operation of the stepping motor;
    a logic circuit structured to generate a first internal signal and a second internal signal indicative of respective states of the first H-bridge circuit and the second H-bridge circuit according to the direction signal and the clock signal;
    a first pre-driver structured to drive the first H-bridge circuit according to the first internal signal; and
    a second pre-driver structured to drive the second H-bridge circuit according to the second internal signal,
    wherein, when the clock signal remains in a predetermined state for a predetermined judgment time, the logic circuit transits to a predetermined mode;
    wherein the predetermined mode is a weak excitation mode,
    and wherein, in the weak excitation mode, the first internal signal and the second internal signal are generated such that an output of the first H-bridge circuit and an output of the second H-bridge circuit are each reduced as compared with a corresponding output current in a normal excitation mode.

2. The driving circuit according to claim 1, wherein the predetermined mode is a high-impedance mode,
    and wherein, in the high-impedance mode, the first internal signal and the second internal signal are generated such that an output of the first H-bridge circuit and an output of the second H-bridge circuit are each set to a high-impedance state.

3. The driving circuit according to claim 2, wherein, in the high-impedance mode, the logic circuit maintains operations of ail circuit blocks of the driving circuit.

4. The driving circuit according to claim 2, wherein, in the high-impedance mode, the logic circuit is structured to shut down a circuit block that is not required to maintain the outputs of the first H-bridge circuit and the second H-bridge circuit in the high-impedance state.

5. A system comprising:
a processor;
a stepping motor; and
the driving circuit according to claim 1, structured to drive the stepping motor according to a direction signal and a clock signal received from the processor.

6. A control method for a stepping motor comprising a first coil and a second coil, the control method comprising:
providing a first H-bridge circuit coupled to the first coil;
providing a second H-bridge circuit coupled to the second coil;
generating, by means of a processor, a clock signal so as to rotationally drive the stepping motor;
generating, by means of the processor, a direction signal that indicates a rotational direction of the stepping motor;
switching a state of the first H-bridge circuit and a state of the second H-bridge circuit according to the direction signal and the clock signal; and
reducing an output current of the first H-bridge circuit and an output current of the second H-bridge circuit when the processor fixes a state of the direction signal and a state of the clock signal over a predetermined period of time.

7. A driving circuit for a stepping motor comprising a first coil and a second coil, the driving circuit comprising:
a first H-bridge circuit coupled to the first coil;
a second H-bridge circuit coupled to the second coil;
a clock pin structured to receive a clock signal that indicates a rotational operation of the stepping motor;
a control pin structured to receive a control signal that sets an output of the first H-bridge circuit and an output of the second H-bridge circuit to a predetermined state;
a logic circuit structured to determine a rotational direction based on a state of the clock signal and a state of the control signal, and to generate a first internal signal and a second internal signal that respectively indicate a state of the first H-bridge circuit and a state of the second H-bridge circuit according to the clock signal;
a first pre-driver structured to drive the first H-bridge circuit according to the first internal signal; and
a second pre-driver structured to drive the second H-bridge circuit according to the second internal signal;
wherein, when the clock signal and the control signal each remain in a predetermined state for a predetermined judgment time, the logic circuit switches a rotational direction to a direction that is the reverse of an immediately previous rotational direction.

8. The driving circuit according to claim 7, wherein the control signal is an enable signal,
and wherein, when the enable signal is set to a predetermined level, the logic circuit shuts down at least a part of the driving circuit.

9. The driving circuit according to claim 7, wherein the control signal is an enable signal,
and wherein, during a period of time in which the enable signal is set to a predetermined level, the logic circuit maintains operations of all circuit blocks of the driving circuit.

10. A system comprising:
a processor;
a stepping motor; and
the driving circuit according to claim 7, structured to drive the stepping motor according to a control signal and a clock signal received from the processor.

11. A driving circuit for a stepping motor comprising a first coil and a second coil, the driving circuit comprising:
a first H-bridge circuit coupled to the first coil;
a second H-bridge circuit coupled to the second coil;
a clock pin structured to receive a clock signal that indicates a rotational operation of the stepping motor;
a control pin structured to receive a control signal that sets an output of the first H-bridge circuit and an output of the second H-bridge circuit to a predetermined state;
a logic circuit structured to determine a rotational direction based on a state of the clock signal and a state of the control signal, and to generate a first internal signal and a second internal signal that respectively indicate a state of the first H-bridge circuit and a state of the second H-bridge circuit according to the clock signal;
a first pre-driver structured to drive the first H-bridge circuit according to the first internal signal; and
a second pre-driver structured to drive the second H-bridge circuit according to the second internal signal;
wherein a control signal is a signal for switching an excitation mode between a weak excitation mode and a normal excitation mode,
and wherein, when the control signal indicates the weak excitation mode, the logic circuit reduces an output current of the first H-bridge circuit and an output current of the second H-bridge circuit.

* * * * *